UNITED STATES PATENT OFFICE.

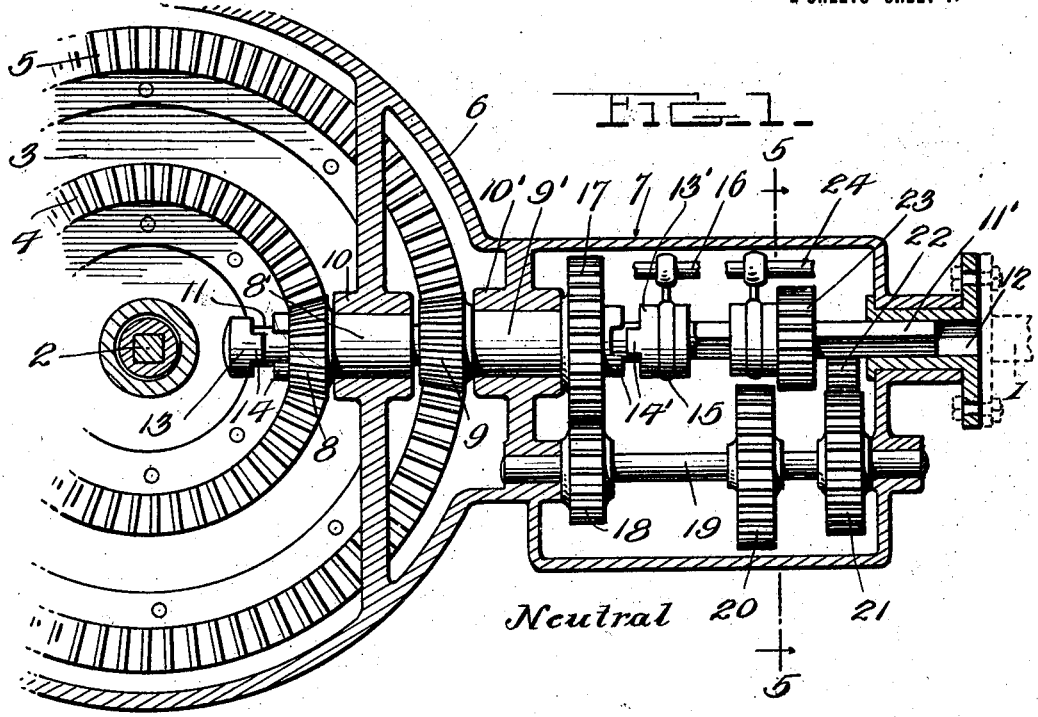
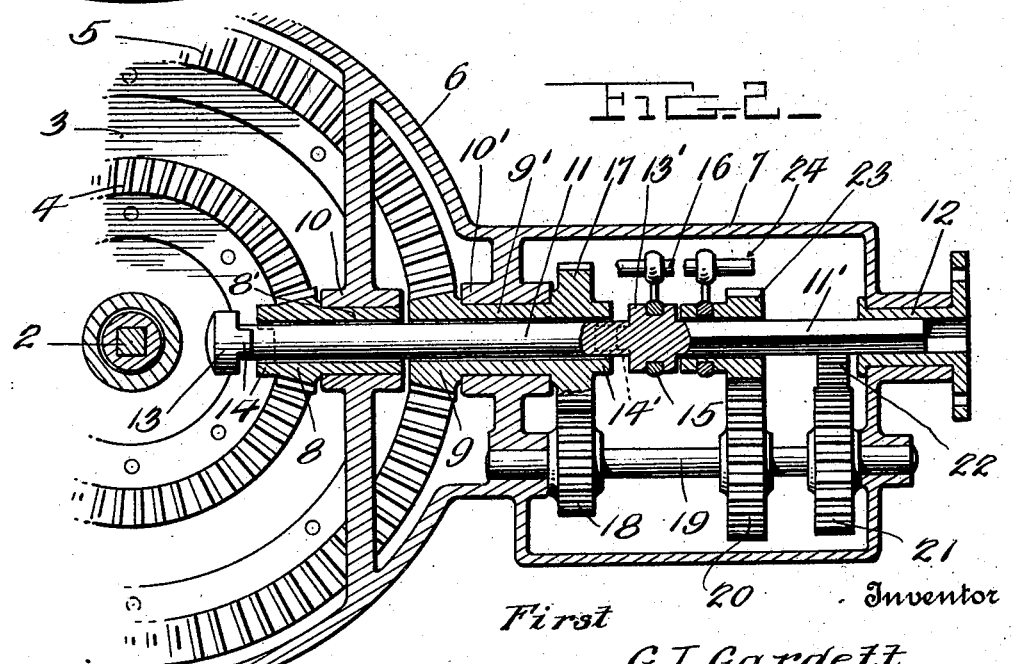

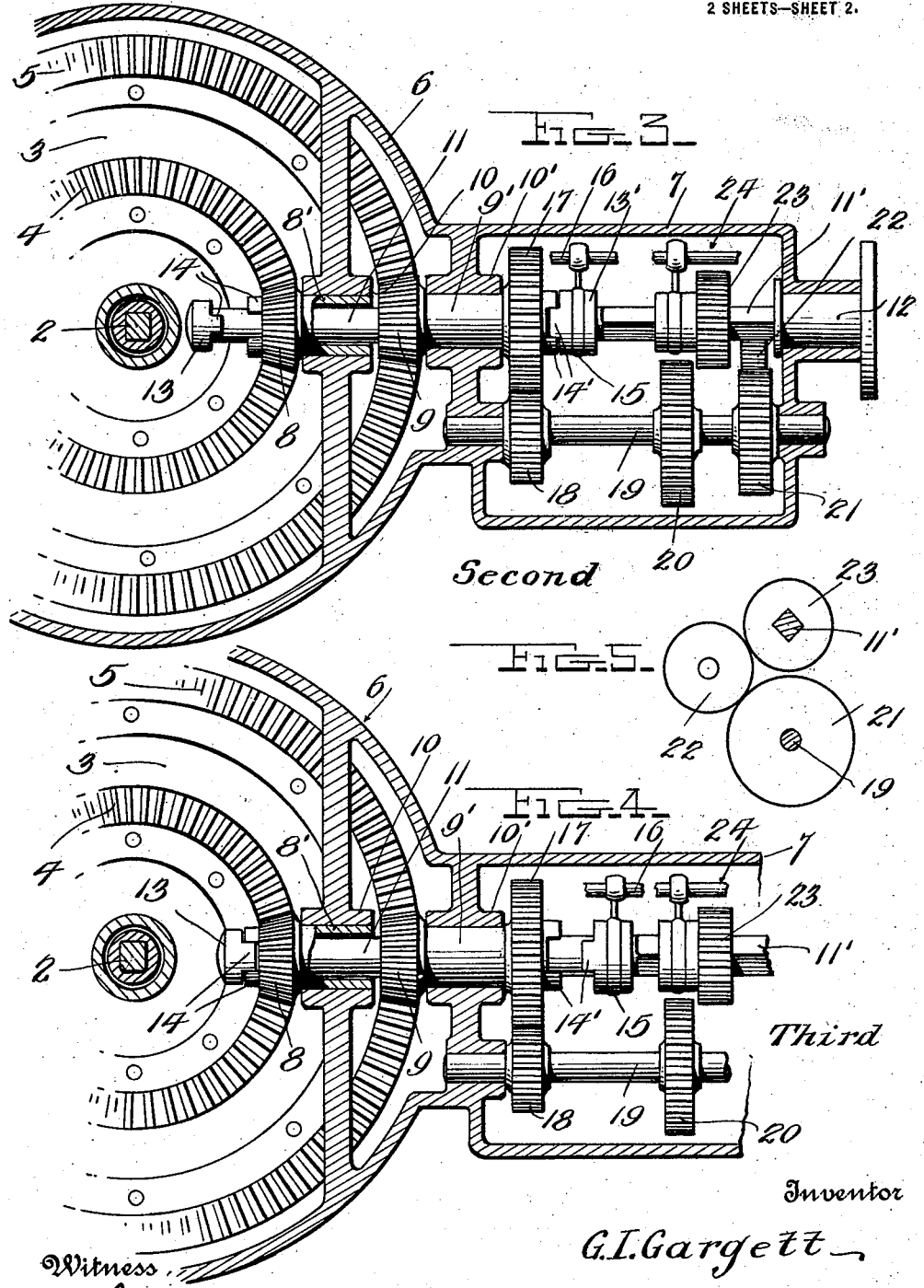

GEORGE IRA GARGETT, OF MOUNT PLEASANT, MICHIGAN.

TRACTOR TRANSMISSION MECHANISM.

1,400,048. Specification of Letters Patent. Patented Dec. 13, 1921.

Application filed May 17, 1918. Serial No. 235,095.

*To all whom it may concern:*

Be it known that I, GEORGE I. GARGETT, a citizen of the United States, residing at Mount Pleasant, in the State of Michigan, have invented certain new and useful Improvements in Tractor Transmission Mechanism; and I do declare the following to be a full, clear, and exact description of the invention, such as will enable others skilled in the art to which it appertains to make and use the same.

This application is in part a continuation of my United States application, Serial No. 207,563, which was filed December 17, 1917, and terminated in Patent 1,278,328, of September 10, 1918.

The principal object of the present invention is to provide in a tractor transmission, a gear ratio for slow work such as plowing and a higher ratio for road work, maintaining a direct drive between the engine shaft and the jack shaft at either speed; and a further object is the provision of emergency low speed and reverse gearing.

With the foregoing objects in view, the invention resides in the novel features of construction and unique combinations of parts to be hereinafter fully described and claimed, the descriptive matter being supplemented by the accompanying drawings which form a part of this specification and in which:

Figures 1, 2, 3 and 4 are longitudinal sectional views with parts in elevation, showing the transmission mechanism in "neutral", "first", "second" and "third"; and Fig. 5 is a diagrammatic transverse section on the plane of the line 5—5 of Fig. 1 showing more particularly the reverse gearing.

In the drawings above briefly described, the numeral 1 (dotted lines in Fig. 1) designates an engine shaft while 2 has reference to a transverse jack shaft employed either for the sole purpose of driving the tractor wheels, or used additionally for operating a pulley to drive other machinery as disclosed in the application above referred to. The jack shaft 2 is provided in both cases with suitable differential mechanism including a disk such as 3 to which inner and outer beveled gear rings 4 and 5 are secured, said disk and rings being contained in a housing 6 joining a transmission housing 7.

A pair of beveled pinions 8 and 9 mesh respectively with the gear rings 4 and 5 and are provided respectively with tubular hubs 8' and 9' which are rotatably mounted in bearings 10 and 10' suitably secured in the casings 6 and 7. A drive shaft 11 passes rotatably and slidably through the hubs 8' and 9' and is provided with a squared end 11' received slidably and non-rotatably in a tubular coupling member 12 which is secured to the engine shaft 1 as indicated in Fig. 1. Shaft 11 is provided at the inner end of pinion 8 and at the free end of hub 9' with a pair of external heads 13 and 13' and clutch teeth 14 and 14' are provided to lock the shaft 11 either to the pinion 8 or to the hub 9' of pinion 9, whereby either of these pinions may be driven by the drive shaft 11. When pinion 9 is driven, it operates the jack shaft 2 at a comparatively low speed, due to the existing ratio between said pinion and the outer gear ring 5, but when pinion 8 drives the gear ring 4 the speed of the jack shaft is increased to the maximum.

Any preferred means could well be employed to shift the shaft 11 longitudinally so as to drive either of the pinions 8 and 9, but I prefer to mount an appropriate shoe 15 in an annular groove formed around the head 13' and to provide a rod 16 for shifting said shoe as required, said rod leading to any preferred shifting lever or the like. As the shaft in question is moved in either direction its squared end 11' slides in the coupling 12 as will be clear from Figs. 1 and 2, and when the shaft in question is in a neutral position as seen in Figs. 1 and 2, it will not drive either pinion 8 or 9 directly, although the latter may be indirectly driven from the shaft by the means yet to be described. It will be observed however that when shaft 11 is shifted to lock either of the pinions thereto, a direct drive is maintained between the engine shaft and the jack shaft, even though two different speeds may be had. For most purposes, the two speeds obtained by the pinions 8 and 9 and the gear rings 4 and 5, are adequate, but in some instances it is necessary to employ a lower gear ratio for extremely heavy pulling and is also of great advantage to provide the machine with a reverse gear. These ends are obtained in the following manner.

A spur gear 17 is fixedly mounted on the hub 9' for rotation bodily therewith and meshes with a gear 18 on a countershaft 19 mounted in the casing 7. This countershaft is provided with a low speed gear 20 and a reverse gear 21, the latter meshing constantly with an idle gear 22. An additional gear 23 is slidable along the squared portion 11' of the shaft 11 and by suitable means 24 may be shifted into a neutral position as seen in Figs. 1, 3 and 4, into mesh with the gear 20 for low speed driving as seen in Fig. 2, or into mesh with the idle gear 22 for rotating the countershaft 19 from the shaft 11 but in reverse direction to the movement of the latter.

When the gearing stands in neutral (see Fig. 1) the gear 23 is out of mesh with both gears 20 and 22, and all of the clutch teeth 14 and 14' are disengaged. The shaft 11 is now driven by the engine shaft, but produces no motion of the jack shaft 2. To throw the gearing into "first" for exceptionally slow speed driving, the means 24 are operated to shift gear 23 in mesh with the gear 20. The countershaft 19 is thus driven from the drive shaft 11 at a reduced speed, gear 18 drives gear 17 at a further reduced speed, and pinion 9 rotates the gear ring 5 so that the jack shaft is turned at a much slower rate than the engine shaft.

To throw the gearing into "second" (see Fig. 3) gear 23 is shifted to neutral position and rod 16 is shifted so that the teeth 14' of the head 13' and the hub 9' interlock. The result is that pinion 9 is driven directly from shaft 11 and it thus rotates the gear ring 5 at a greater rate of speed than when said pinion is driven as seen in Fig. 2.

To shift into "third" which is the highest speed attainable by the transmission, gear 23 remains in neutral and shaft 11 is shifted to disengage the teeth 14' and at the same time interlock the teeth 14 of head 13 and pinion 8. This pinion is now driven directly from the shaft 11 and due to the fact that the ring 4 is of smaller diameter than 5, a direct drive from shaft 11 to ring 4, will produce a higher speed of the jack shaft 2.

Whenever it is required to reverse, gear 23 is shifted into mesh with the idle gear 22, the latter then driving the countershaft 19 by means of the gear 21. This shaft then rotates pinion 9 by means of the gears 18 and 17 so that the gear ring 5 of the jack shaft 2 is reversely driven at slow speed.

From the foregoing, taken in connection with the accompanying drawings, it will be obvious that I have provided a comparatively simple and inexpensive tractor transmission mechanism by which the two speeds required for ordinary work ("second" and "third") may be attained with a direct drive from the engine shaft to the jack shaft, and by which an emergency low speed and reverse may be attained when required. The invention is designed particularly for tractors due to the comparatively large diameter of the gear ring 5, which would render it more or less impractical for use upon motor vehicles of other kinds unless provided with wheels of unusual size. Under such conditions however the transmission could well be used for this purpose.

Since probably the best results are obtained from the several details shown and described, these details are by preference employed, but within the scope of the invention as claimed, considerable latitude is allowed for making the numerous minor changes which occasion may dictate.

I claim:

In a transmission, a housing, a jack shaft, a disk carried by said jackshaft in the housing and having inner and outer concentric gear rings, bearings in said housing, sleeves rotatably mounted in said bearings, a pinion carried by one of said sleeves and meshing with the inner gear ring and provided with a clutch element, a sleeve rotatably mounted in the other bearing and having a pinion at one end meshing with the outer gear ring and a pinion at its other end having a clutch element, a driven shaft slidably and rotatably passing through the sleeves and pinions, a clutch element upon the end of the driven shaft for engaging the clutch element of the first pinion when the driven shaft is moved in one direction, a clutch element intermediate the length of the driven shaft for engaging the clutch element of the pinion carried by the second sleeve when the driven shaft is moved longitudinally in an opposite direction, a countershaft, a pinion carried by the countershaft and meshing with the clutch carrying pinion of the second sleeve, spaced gears rigid upon said countershaft, an idler gear meshing with one of the spaced gears, and a gear slidably carried by the driven shaft and rotating with the same and means for moving the last mentioned gear longitudinally upon the driven shaft for selective engagement with the idler gear and second spaced gear of the countershaft to rotate the countershaft in a predetermined direction.

In testimony whereof I have hereunto set my hand.

GEORGE IRA GARGETT.

Witnesses:
JOHN W. GLASS,
CARL E. GALLAGHER.